US009139080B2

(12) United States Patent
Park

(10) Patent No.: US 9,139,080 B2
(45) Date of Patent: Sep. 22, 2015

(54) IN-WHEEL ACTUATOR AND IN-WHEEL ASSEMBLY COMPRISING THE SAME

(71) Applicant: Samsung Electronics Co., Ltd., Suwon-si (KR)

(72) Inventor: Tae-Sang Park, Suwon-si (KR)

(73) Assignee: SAMSUNG ELECTRONICS CO., LTD., Suwon-sii (KR)

( * ) Notice: Subject to any disclaimer, the term of this patent is extended or adjusted under 35 U.S.C. 154(b) by 99 days.

(21) Appl. No.: 13/892,650

(22) Filed: May 13, 2013

(65) Prior Publication Data
US 2014/0070600 A1 Mar. 13, 2014

(30) Foreign Application Priority Data
Sep. 10, 2012 (KR) .................. 10-2012-0100094

(51) Int. Cl.
| F16H 57/04 | (2010.01) |
| B60K 7/00 | (2006.01) |
| F16C 3/02 | (2006.01) |
| H02K 7/116 | (2006.01) |
| H02K 5/18 | (2006.01) |
| H02K 7/14 | (2006.01) |
| H02K 9/08 | (2006.01) |
| B60K 17/04 | (2006.01) |
| H02K 1/32 | (2006.01) |
| H02K 7/102 | (2006.01) |

(52) U.S. Cl.
CPC ............... *B60K 7/0007* (2013.01); *F16C 3/02* (2013.01); *F16H 57/0412* (2013.01); *H02K 5/18* (2013.01); *H02K 7/116* (2013.01); *H02K 7/14* (2013.01); *H02K 9/08* (2013.01); *B60K 17/046* (2013.01); *B60K 2007/0038* (2013.01); *B60K 2007/0092* (2013.01); *H02K 1/32* (2013.01); *H02K 7/102* (2013.01); *Y02T 10/641* (2013.01); *Y10T 464/10* (2015.01)

(58) Field of Classification Search
None
See application file for complete search history.

(56) References Cited

U.S. PATENT DOCUMENTS 4,346,624 A * 8/1982 Nagasaki et al. ............. 475/159
4,616,736 A * 10/1986 Fox ............................. 184/6.12

(Continued)

FOREIGN PATENT DOCUMENTS

| JP | 04073448 A * 3/1992 |
| JP | 2006248273 A 9/2006 |

(Continued)

*Primary Examiner* — Dirk Wright
(74) *Attorney, Agent, or Firm* — Sughrue Mion, PLLC

(57) ABSTRACT

An in-wheel assembly is provided, and the in-wheel assembly includes an in-wheel actuator and a wheel. The in-wheel actuator includes a driving motor; a decelerator which is disposed inside the driving motor and configured to reduce a rotational speed of the driving motor; and a hollow shaft which is disposed inside the driving motor and configured to transfer a rotational force of the driving motor to the decelerator, which is accommodated in a hollow of the hollow shaft, and circulates fluid inside of the driving motor with respect to a surface of the decelerator when driven to rotate by the driving motor. The wheel accommodates the in-wheel actuator and receives a rotational speed reduced by the decelerator to rotate.

12 Claims, 8 Drawing Sheets

(56) References Cited

U.S. PATENT DOCUMENTS

| | | | |
|---|---|---|---|
| 5,087,229 A | | 2/1992 | Hewko et al. |
| 5,111,090 A | | 5/1992 | Otake et al. |
| 5,156,579 A | * | 10/1992 | Wakuta et al. ............ 475/161 |
| 5,894,902 A | * | 4/1999 | Cho ............................ 180/65.51 |
| 2003/0067228 A1 | * | 4/2003 | Vanjani ........................ 310/64 |
| 2007/0078035 A1 | * | 4/2007 | Oshidari ...................... 475/149 |
| 2009/0032321 A1 | * | 2/2009 | Marsh et al. ............ 180/65.51 |
| 2010/0113204 A1 | * | 5/2010 | Zeirke et al. ................ 475/159 |
| 2014/0031160 A1 | * | 1/2014 | Suzuki et al. ............... 475/149 |

FOREIGN PATENT DOCUMENTS

| | | | |
|---|---|---|---|
| JP | 2008213777 A | | 9/2008 |
| JP | 201111685 A | | 1/2011 |
| JP | 2011148331 A | | 8/2011 |
| SU | 635328 A | * | 11/1978 |

* cited by examiner

IN-WHEEL ACTUATOR AND IN-WHEEL ASSEMBLY COMPRISING THE SAME

CROSS-REFERENCE TO RELATED APPLICATION

This application claims priority from Korean Patent Application No. 10-2012-0100094, filed on Sep. 10, 2012, in the Korean Intellectual Property Office, the entire disclosure of which is incorporated herein by reference for all purposes.

BACKGROUND

1. Field

The following description relates to an in-wheel actuator applicable to a vehicle, such as an electric automobile, which is driven with electrical power, and an in-wheel assembly comprising the same.

2. Description of the Related Art

Hybrid vehicles and electric vehicles have gained more popularity due to harmful environmental effects from air pollution and shortage of fossil fuels. A hybrid vehicle mainly uses an internal-combustion engine to generate power and uses an electric motor as an auxiliary power source. An electric vehicle uses an electric motor as a main power source.

With the development of technologies for batteries and motors, it is expected that electric vehicles, known as pollution-free vehicles, replace "transition" vehicles, such as hybrid vehicles, since electric vehicles emit no pollutants or carbon dioxide during driving.

An in-wheel system has a driving motor mounted in a wheel, transfers power from the driving motor directly to the wheel. The application of the in-wheel system allows a vehicle to have a compact and organized driving system, thereby reducing vehicle weight and improving a degree of freedom in vehicle layout or design. In addition, the in-wheel system contributes to optimization of a vehicle frame to increase collision safety. Further, the in-wheel system increases drive motor performance of the vehicle and facilitates a larger interior space by optimally balancing the weight across the vehicle.

A break and a bearing, supporting a hub, are installed inside a wheel of the above-mentioned in-wheel assembly. Further, a driving motor is installed in the rest of the inside of the wheel. Therefore, to prevent an interruption from a vehicle body, a slim driving motor is required. However, there is a limit to reducing the size of the driving motor, since a high output torque is needed for driving a vehicle. In order to generate high output torque and reduce the size of a driving motor, a decelerator may be installed in an output shaft of a driving motor so as to increase output torque, so that both the decelerator and the driving motor are installed inside of the wheel.

When operation of the driving motor and the decelerator occurs, both the driving motor and the decelerator are heated. Therefore, if the heat of the driving motor is transferred to the decelerator, the temperature of the decelerator may exceed a limited operating temperature. Further, if the heat of the decelerator is transferred to the driving motor, the temperature of the driving motor may increase. Thus, endurance and performance of the driving motor may be affected. Therefore, there is a need for a technology to efficiently cool down a decelerator.

SUMMARY

According to an aspect of an embodiment, there is provided an in-wheel actuator including a driving motor; a decelerator which is disposed inside the driving motor and configured to reduce a rotational speed of the driving motor; and a hollow shaft which is disposed inside the driving motor and configured to transfer the rotational force of the driving motor to the decelerator, which is accommodated in a hollow of the hollow shaft, and allow fluid inside the driving motor to circulate with respect to a surface of the decelerator when driven to rotate by the driving motor.

According to an aspect of another embodiment, there is provided an in-wheel assembly including an in-wheel actuator which includes a driving motor, a decelerator which is disposed inside the driving motor and configured to reduce a rotational speed of the driving motor, and a hollow shaft which is disposed inside the driving motor and configured to transfer the rotational force of the driving motor to the decelerator, which is accommodated in a hollow of the hollow shaft, and allow fluid inside of the driving motor to circulate with respect to a surface of the decelerator when driven to rotate by the driving motor; and a wheel which is configured to accommodate the in-wheel actuator inside the wheel and receive the reduced rotational speed from the decelerator to thereby rotate.

According to an aspect of another embodiment, there is provided a decelerator of an in-wheel actuator including a decelerator housing which is disposed in a hollow of a hollow shaft and fixed to a motor housing; and a decelerating part which is disposed inside the decelerator housing and configured to reduce a rotational force received from the hollow shaft.

Other features and aspects may be apparent from the following detailed description, the drawings, and the claims.

BRIEF DESCRIPTION OF THE DRAWINGS

The above and/or other aspects will become more apparent and readily appreciated from the following description of exemplary embodiments, taken in conjunction with the accompanying drawings, in which.

DETAILED DESCRIPTION

Figure 1:
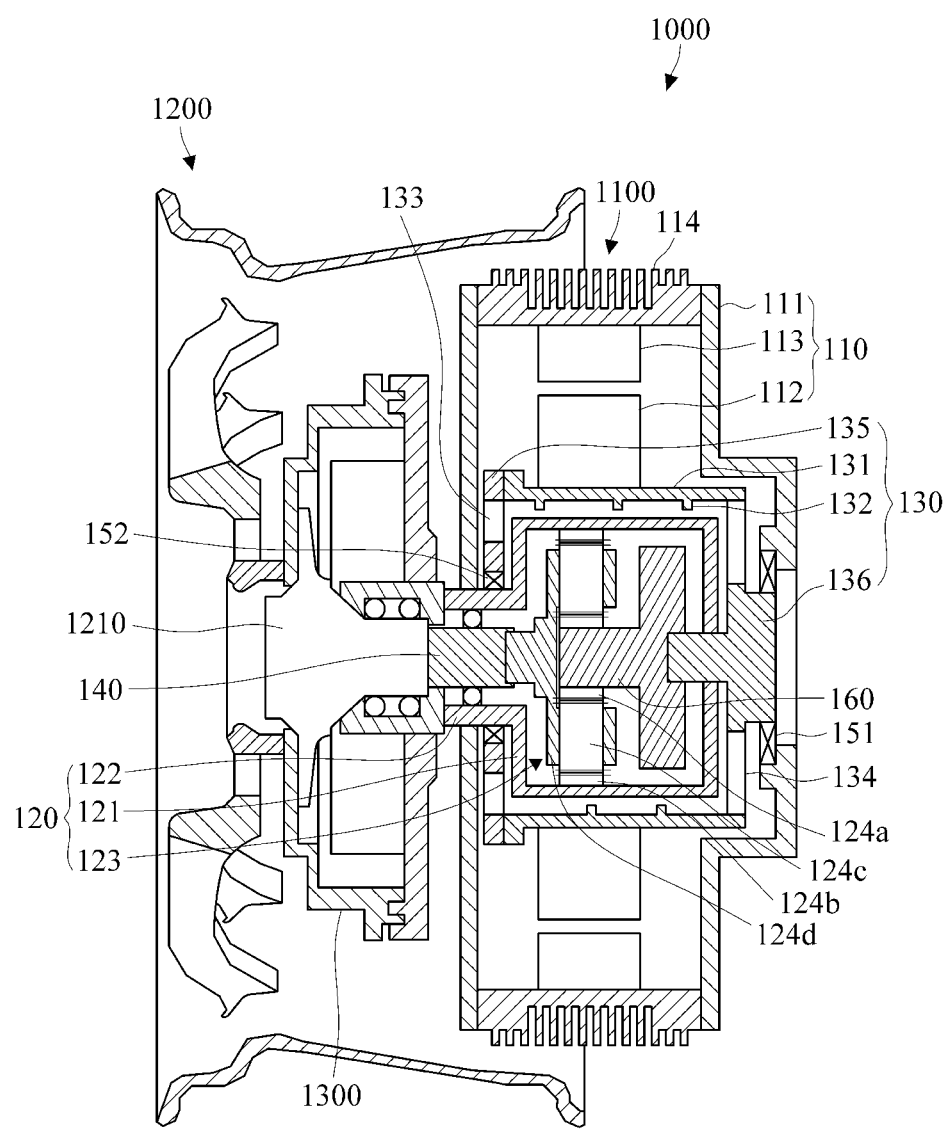
FIG. 1 is a cross-sectional view illustrating an in-wheel assembly according to an exemplary embodiment.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

FIG. 1 is a cross-sectional view illustrating an in-wheel assembly according to an exemplary embodiment.

Referring to FIG. 1, an in-wheel assembly 1000 includes an in-wheel actuator 1100 and a wheel 1200.

The in-wheel actuator 1100 includes a driving motor 110, a decelerator 120, and a hollow shaft 130. The driving motor 110 may generate driving power to rotate the wheel 1200. The decelerator 120 decreases a rotational speed of the driving motor 110.

The rotational speed, decreased by the decelerator 120, may be output through an output shaft 140. Accordingly, high-speed and low-torque driving of the driving motor 110 may be converted to the decelerator 120 as low-speed and high-torque driving of the output shaft 140.

The hollow shaft 130 is a shaft having a hollow, and accommodates the decelerator 120 in the hollow. The hollow shaft 130 transfers the rotational force of the driving motor 110 inside the driving motor 110 to the decelerator 120. In other words, the hollow shaft 130 rotates by receiving the rotational force of the driving motor 110. The rotational force of the hollow shaft 130 is transferred to the decelerator 120. When rotating is driven by the driving motor 110, the hollow shaft 130 allows fluid inside of the driving motor 110 to flow with respect to the surface of the decelerator 120. As an example, the fluid inside the driving motor 110 may be a cooling gas, such as air. Of course, the fluid may be a liquid, such as insulating oil with a cooling function.

The fluid on the surface of the decelerator 120 may promote heat exchange between the face of the decelerator 120 and the fluid. Accordingly, when the driving motor 110 is driven by the decelerator 120, more heat may be released from the decelerator 120. Hence, the decelerator 120 may cool down more efficiently.

In addition, as the fluid on the surface of the decelerator 120 inside of the driving motor 110 cools down the temperature of the heated driving motor 110, less heat may be transferred from the driving motor 110 to the decelerator 120. Accordingly, the fluid on the surface of the decelerator 120 may lead the decelerator 120 to operate properly, and less heat would be transferred from the decelerator 120 to the driving motor 110. As a result, the fluid on the surface of the decelerator 120 may be able to prevent performance and endurance of the driving motor 110 from deteriorating.

The wheel 1200 accommodates the in-wheel actuator 1100, and receives a rotational force of the output shaft 140 to thereby rotate. The wheel 1200 may rotate, due to the configuration that the hub 1210 installed at the center of rotation of the wheel 1200 is connected to the output shaft 140. The wheel 1200 may be configured such that a tire (not shown) can be mounted on the circumference of the wheel 1200. Inside the wheel 1200, a drum break 1300, rather than a driving motor 110, may be arranged closer to the wheel 1200 and mounted on the wheel 1200.

The driving motor 110 may include a motor housing 111, a rotor 112, and a stator 113. The motor housing 111 may be in a cylindrical shape having an inner space to accommodate the rotor 112 and the stator 113. The output shaft 140 may be drawn out from a through-hole formed on the surface of the motor housing 111 toward the wheel 1200. In addition, radiating fins 114 may be formed on the outer surface of the motor housing 111. Due to the radiating fins 114, the outer surface of the motor housing 111 may have a larger area to radiate, thereby achieving improved radiant heat performance of the motor housing 111 using air-cooling effects.

The rotor 112 is rotatably disposed in the middle of the motor housing 111. The hollow shaft 130 is inserted into the center portion of the rotor 112 in a direction of a rotational axis, and then fixed to the rotor 112. For example, the rotor 112 may have a cylindrical shape having a through-hole at the center thereof. The hollow shaft 130 may be fixed onto the inner circumference of the rotor 112. Accordingly, during rotation of the rotor 112, the hollow shaft 130 may be rotated with the rotor 112. Therefore, a rotational force of the rotor 112 may be transferred through the hollow shaft 130 to the decelerator 120.

The stator 113 is spaced apart from the circumference of the rotor 112. The stator 113 is fixed onto the inner surface of the motor housing 111. For example, the stator 113 may have a cylinder shape, having a hollow into which the rotor 112 is inserted therein, and fixed onto the inner circumference of the motor housing 111. The rotor 112 may have a permanent magnet, and the stator 113 may have a stator coil. If current is provided to the stator coil when a magnetic field is generated by the permanent magnet, the rotor 112 is rotates by electromagnetic power to thereby generate a driving force.

The decelerator 120 may include a decelerator housing 121 and a decelerating part 123. The decelerator housing 121 is accommodated by the motor housing 111. For example, the decelerator housing 121 is placed in a hollow of the hollow shaft 130. In addition, the decelerator housing 121 is fixed to the motor housing 111. The decelerator housing 121 may include a decelerator fixing part 122 which is fixed to the motor housing 111. A through-hole is formed at the center of one end of the decelerator housing 121 (i.e., the end closer to the wheel 1200 than the other end), and the output shaft 140 may be drawn out through the through-hole. The decelerating fixing part 122 may be extended from surroundings of the through-hole, toward the wheel 1200, to surround the circumference of the output shaft 140 and then fixed to the motor housing 111.

The output shaft 140 to be drawn out from the through-hole formed on one end of the decelerator housing 121 (i.e., the end closer the wheel 1200 than the other). The decelerating part 123 decreases a rotational speed, received from the hollow shaft 130 within the decelerator housing 121.

Figure 2:
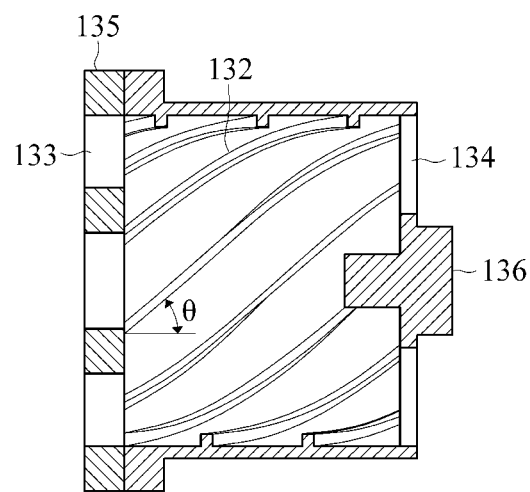
FIG. 2 is a cross-sectional view illustrating a hollow shaft in FIG. 1.
Figure 3:
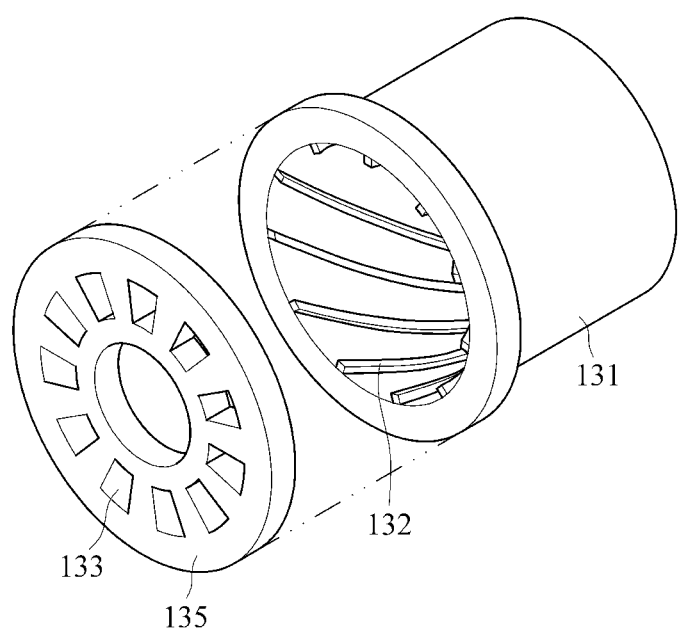
FIG. 3 is a left-side exploded perspective view illustrating the hollow shaft in FIG. 2.
Figure 4:
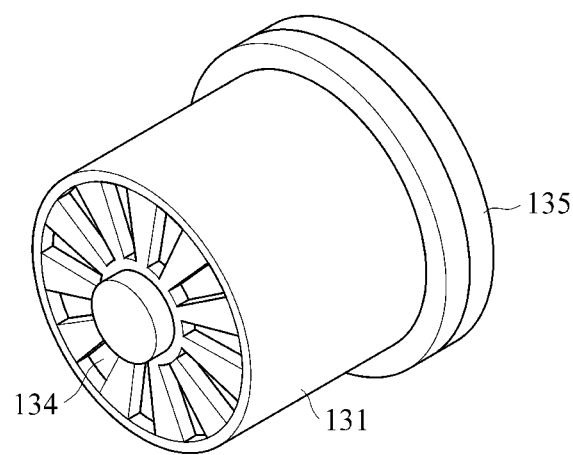
FIG. 4 is a right-side perspective view illustrating the hollow shaft in FIG. 2.

Referring to FIGS. 1, 2, and 4, the hollow shaft 130 may include a shaft body 131 and one or more vanes 132.

The shaft body 131 transfers a rotational force of the driving motor 110 to the decelerator 120. In other words, the shaft body 131 is fixed onto an inner surface of the rotor 112 to transfer the rotational force of the rotor 112 to the decelerator 120. The shaft body 131 has a hollow to accommodate the decelerator 120. Fluid gates 133 and 134 are respectively formed at two ends of the shaft body 131, to help fluid drawn in or discharged through the hollow.

The vanes 132 are formed on the inner surface of the hollow to blow fluid, in response to rotation of the shaft body 131. Hereinafter, for convenience, one end of the shaft body 131 toward the wheel 1200 is indicated as a front end, and the other end is referred to as a back end.

The vanes 132 may be formed helically to blow fluid toward the axis of the shaft body 131. A volume of the fluid depends on an angle ($\theta$) and the number of the vanes 132. The greater volume of the fluid, the more efficiently the fluid cools down the decelerator 120. In addition, an angle ($\theta$) of the vanes 132 affects the volume of fluid and moment of resistance. Even when the volume of the fluid increases, it is preferable and advantageous to have a low moment of resistance. For this reason, an angle (θ) of the vanes 132 may be set within a range from 60° to 73°.

In addition, the greater number of vanes 132, the greater volume of fluid. However, if the number of the vanes exceeds 80, the volume of the fluid tends to reduce. Thus, it may be preferable that the number of the vanes 132 is under 80. However, the above description is an example. Since a configuration of the hollow shaft 130 and the decelerator housing 121 may change, the conditions which affect an angle and the number of the vanes 132 may also change.

A plurality of fluid gates 133 may be provided at a front end of the shaft body 131. At the front end of the shaft body 131, the fluid gates 133 are radially extended from the center of rotation, and spaced apart from each other around a circumference. If the front end of the shaft body 131 is open and a shaft cover 135 is connected to the open front end of the shaft body 131, the fluid gates 133 may be formed on the shaft cover 135. The shaft cover 135 may have a through-hole through which the decelerator fixing part 122 may be drawn out.

A shaft protruding part 136 may be formed at a back end of the shaft body 131. At the back end of the shaft body 131, the shaft protruding part 136 is connected to the center of rotation. A front end and a back end of the shaft protruding part 136 may protrude from the back end of the shaft body 131 toward the inside and the outside of the decelerator housing 121, respectively. The fluid gates 134 may be radially extended from the center of rotation, and spaced apart from each other along a circumference of the shaft protruding part 136.

Figure 5:
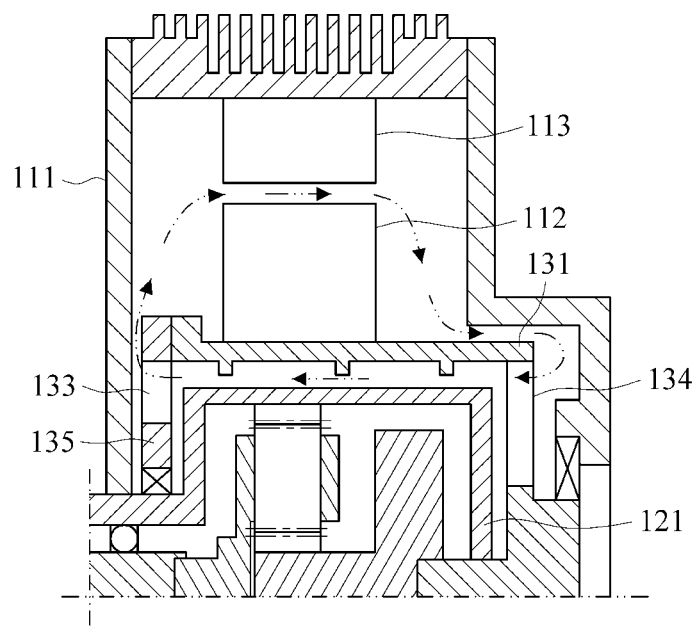
FIG. 5 is a diagram illustrating a fluid flow path during rotation of a hollow shaft of FIG. 1.

As shown in FIG. 5, the vanes 132 may allow fluid to be drawn into a hollow of the shaft body 131 through the fluid gates 134 located at the back end of the shaft body 131, and to be discharged through the fluid gates 133 of the shaft cover 135.

In this case, the fluid inside of the motor housing 111 may circulate. The fluid is drawn into a hollow of the shaft body 131 through the fluid gates 134 located at the back end of the shaft body 131, and then cools down the decelerator 120 by flowing between the inner surface of the shaft body 131 and the outer surface of the decelerator housing 121. Next, the fluid is discharged through the fluid gates 133 of the shaft cover 135 to go through a gap between the rotor 112 and the stator 113, thereby being drawn into the hollow of the shaft body 131 through the fluid gates 134, located at the back end of the shaft body 131.

In another example, the vanes 132 may allow the fluid to be drawn into the hollow of the shaft body 131 through the fluid gates 133 of the shaft cover 135, and to be discharged through the fluid gates 134 located at the back end of the shaft body 131. In this case, the fluid circulates in an opposite direction, compared to a direction illustrated in FIG. 5.

Referring to FIG. 1, bearings 151 may be installed between the back end of the shaft protruding part 136 and the motor housing 111 to support rotation of the shaft protruding part 136. In addition, bearings 152 may be installed between the shaft cover 135 and the decelerator fixing part 122 to support rotation of the shaft cover 135.

Figure 6:
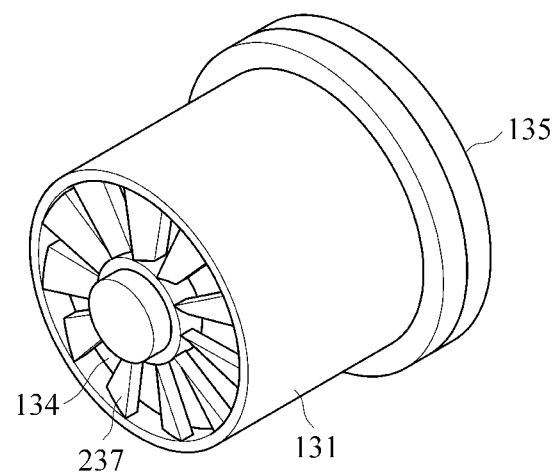
FIG. 6 is an perspective view illustrating another example of the hollow shaft shown in FIG. 3.

FIG. 6 is a perspective view of an exemplary example of the hollow shaft. Referring to FIG. 6, blades 237 are respectively formed between every two fluid gates 134 located at the back end of the shaft body 131. During the rotation of the shaft body 131, the blades 237 blow fluid.

The blades 237 may be configured to allow fluid to be drawn into a hollow of the shaft body 131 through the fluid gates 134, or to be discharged through the fluid gates 134 from the hollow of the shaft body 131. When the blades 237 are installed to the back end of the shaft body 131, the vanes 132 may be omitted. However, if the vanes 132 are included, the blades 237 are configured to blow fluid in a same direction as a fluid-blowing direction of the vanes 132.

Even though not illustrated in the drawings of the exemplary embodiments, blades may be respectively formed between every two fluid gates 133. The blades of the shaft cover 135 are configured to blow fluid in a same direction as a fluid-blowing direction of blades 237, located at the back end of the shaft body 131.

Figure 7:
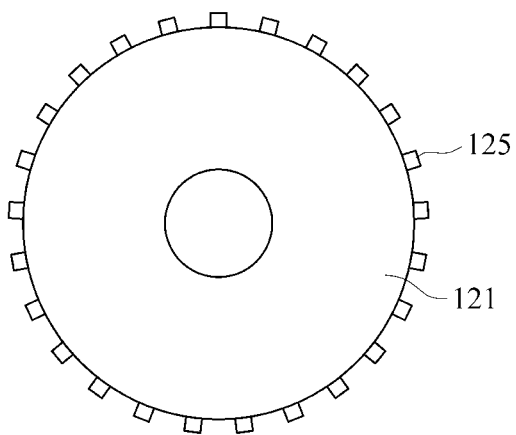
FIG. 7 is a diagram illustrating radiating fins formed on a decelerator housing in FIG. 1.

Referring to FIG. 7, a plurality of radiating fins 125 for a decelerator housing 121 may be arranged on the outer circumference of the decelerator housing 121. The radiating fins 125 for a decelerator housing 121 increases a radiant heat area of the outer surface of the decelerator housing 121. Thus, as the hollow shaft 130 helps fluid to circulate, radiant heat performance of the decelerator housing 121 is improved. The radiating fins 125 for a decelerator housing 121 may be configured in various ways, so long as flow resistance of fluid circulating on the outer surface of the decelerator housing 121 and the inner surface of the shaft body 131 is minimized.

Meanwhile, the decelerating part 123 may reduce a rotational speed received from the rotor 112 by one step, and then transfer to the output shaft 140 the rotational speed reduced by one step.

Figure 8:
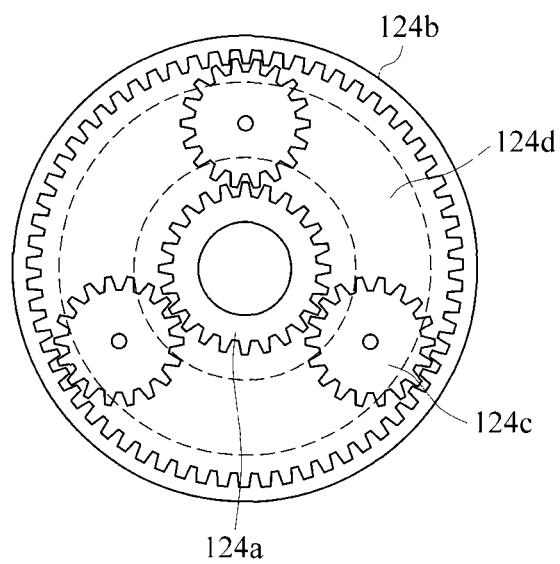
FIG. 8 is a diagram illustrating a configuration of a decelerating part in FIG. 1.

Referring to FIGS. 1 and 8, the decelerating part 123 may include a sun gear 124a, a ring gear 124b, a plurality of planet gears 124c, and a carrier 124d.

The sun gear 124a is connected to the hollow shaft 130, and rotates by receiving a rotational force of the rotor 112. The sun gear 124a may be formed on the outer circumference of a shaft member 160 connected to the front end of the shaft protruding part 136. The ring gear 124b is formed on the inner surface of the decelerator housing 121, facing the sun gear 124a. During the rotation of the sun gear 124a, the ring gear 124b is fixed, rather than being rotated with the sun gear 124a.

The planet gears 124c are arranged between the sun gear 124a and the ring gear 124b, around a circumference of the sun gear 124a. Each of the planet gears 124c has one end engaged with the sun gear 124a, and the other end engaged with the ring gear 124b. During the rotation of the sun gear 124a, the planet gears 124c orbit and revolve between the sun gear 124a and the ring gear 124b.

The carrier 124d is coupled to the output shaft 140. In addition, the carrier 124d is coupled to the planet gears 124c, to thereby rotate around a rotational axis of the output shaft 140 during revolution of the planet gears 124c. At this time, each of the planet gears 124c is orbitably installed to the carrier 124d. The carrier 124d transfers to the output shaft 140 a rotational power generated from the revolution of the planet gears 124c.

An operation of the decelerating part 123 will now be described. If the sun gear 124a is driven by the rotor 112 to thereby rotate, a rotational force of the carrier 124d is slower than that of the rotor 112. Accordingly, the rotational speed of the rotor 112 is decreased by the decelerating part 123, and the decreased rotational speed is transferred to the output shaft 140. Meanwhile, the exemplary embodiments are not limited. Thus, a decelerating part may decrease the rotational speed received from the rotor 112 by two steps, and transfer to the output shaft 140 the rotational speed reduced by two steps. In this case, a high reduction ratio may be achieved. Thus, the output shaft 140 may output a higher torque.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An in-wheel actuator comprising:
a driving motor;
a decelerator which is disposed inside the driving motor and configured to reduce a rotational speed of the driving motor; and
a hollow shaft which is disposed inside the driving motor and configured to transfer a rotational force of the driving motor to the decelerator and circulates fluid inside the driving motor with respect to a surface of the decelerator when driven to rotate by the driving motor,
wherein the hollow shaft comprises:
a shaft body which is configured to transfer the rotational force of the driving motor to the decelerator and has a hollow formed therein and two ends with a plurality of fluid gates formed therein, the fluid being drawn in or discharged through the hollow of the shaft body through the fluid gates, wherein the decelerator is accommodated in the hollow of the shaft body; and
at least one vane which is provided on an inner surface of the shaft body in the hollow of the shaft body, and is configured to blow the fluid during rotation of the shaft body.

2. The in-wheel actuator of claim 1, wherein, at one or both of the two ends of the shaft body, the plurality of the fluid gates are radially extended from a center of rotation and spaced apart from each other around a circumference of the shaft body, and blades are respectively formed between every two fluid gates of the shaft body to blow the fluid in a same direction as a fluid blowing direction of the at least one vane during the rotation of the shaft body.

3. The in-wheel actuator of claim 1, wherein the driving motor comprises:
a motor housing;
a rotor which is rotatably arranged inside the motor housing and fixed to the hollow shaft which is inserted into a center portion of the rotor in a direction of a rotational axis; and
a stator which is spaced apart from a circumference of the rotor and fixed onto an inner surface of the motor housing.

4. The in-wheel actuator of claim 3, wherein a plurality of radiating fins of the motor housing are provided on an outer surface of the motor housing.

5. The in-wheel actuator of claim 1, wherein the decelerator comprises:
a decelerator housing which is disposed in the hollow of the shaft body; and
a decelerating part which is disposed inside the decelerator housing and surrounded by the decelerator housing and configured to reduce the rotational force received from the hollow shaft.

6. The in-wheel actuator of claim 5, wherein a plurality of radiating fins of the decelerator housing are provided on an outer circumference of the decelerator housing.

7. An in-wheel assembly comprising:
an in-wheel actuator which comprises a driving motor, a decelerator which is disposed inside the driving motor and configured to reduce a rotational speed of the driving motor, and a hollow shaft which is disposed inside the driving motor and configured to transfer the rotational force of the driving motor to the decelerator and circulates fluid inside of the driving motor with respect to a surface of the decelerator when driven to rotate by the driving motor; and
a wheel which is configured to accommodate the in-wheel actuator inside the wheel and receive the reduced rotational speed from the decelerator to rotate,
wherein the hollow shaft comprises:
a shaft body which is configured to transfer the rotational force of the driving motor to the decelerator and has the hollow formed therein and two ends with a plurality of fluid gates formed therein, the fluid being drawn in or discharged through the hollow of the shaft body through the fluid gates, wherein the decelerator is accommodated in the hollow of the shaft body; and
at least one vane which is formed on an inner surface of the shaft body in the hollow of the shaft body, and is configured to blow the fluid during the rotation of the shaft body.

8. The in-wheel assembly of claim 7, wherein, at one or both of the two ends of the shaft body, the plurality of the fluid gates are radially extended from a center of rotation and spaced apart from each other around a circumference of the shaft body, and blades are respectively formed between every two fluid gates of the shaft body and configured to blow the fluid in a same direction as a fluid blowing direction of the at least one vane during the rotation of the shaft body.

9. The in-wheel assembly of claim 7, wherein the driving motor comprises
a motor housing;
a rotor which is rotatably arranged inside the motor housing and fixed to the hollow shaft which is inserted into a center portion of the rotor in a direction of a rotational axis; and
a stator which is spaced apart from a circumference of the rotor and fixed onto an inner surface of the motor housing.

10. The in-wheel assembly of claim 9, where a plurality of radiating fins of the motor housing are provided on an outer surface of the motor housing.

11. The in-wheel assembly of claim 7, wherein the decelerator comprises:
a decelerator housing which is disposed in the hollow of the shaft body; and
a decelerating part which is disposed inside the decelerator housing and surrounded by the decelerator housing and configured to reduce the rotational force received from the hollow shaft.

12. The in-wheel assembly of claim 11, wherein a plurality of radiating fins of the decelerator housing is formed on an outer circumference of the decelerator housing.

* * * * *